US012665981B2

(12) United States Patent
Zhang et al.

(10) Patent No.: US 12,665,981 B2
(45) Date of Patent: Jun. 23, 2026

(54) SPECIAL-EFFECT DISPLAY METHOD AND APPARATUS, AND DEVICE AND MEDIUM

(71) Applicant: BEIJING ZITIAO NETWORK TECHNOLOGY CO., LTD., Beijing (CN)

(72) Inventors: Xiaogeng Zhang, Beijing (CN); Yahan Liang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/364,003

(22) Filed: Aug. 2, 2023

(65) Prior Publication Data

US 2024/0022681 A1     Jan. 18, 2024

Related U.S. Application Data

(63) Continuation of application No. PCT/CN2022/074919, filed on Jan. 29, 2022.

(30) Foreign Application Priority Data

Feb. 4, 2021     (CN) .......................... 202110157069.5

(51) Int. Cl.
　　*H04N 5/272*　　　(2006.01)
　　*G06T 5/20*　　　(2006.01)
　　　　(Continued)
(52) U.S. Cl.
　　CPC .............. *H04N 5/272* (2013.01); *G06T 5/20* (2013.01); *G06T 5/50* (2013.01); *G06T 7/70* (2017.01);
　　　　(Continued)

(58) Field of Classification Search
　　CPC .. H04N 5/272; G06T 7/70; G06T 5/20; G06T 5/50; G06T 11/203; G06T 2207/20221; G06T 2207/30201
　　　　(Continued)

(56) References Cited

U.S. PATENT DOCUMENTS

2014/0313144 A1　10/2014　Seto et al.
2014/0368455 A1　12/2014　Croisonnier et al.
　　　　(Continued)

FOREIGN PATENT DOCUMENTS

CN　　102081803 A　　6/2011
CN　　104714743 A　　6/2015
　　　　(Continued)

OTHER PUBLICATIONS

International Search Report (with English translation) and Written Opinion issued in PCT/CN2022/074919, dated Apr. 20, 2022, 13 pages provided.
　　　　(Continued)

*Primary Examiner* — Hai Tao Sun
(74) *Attorney, Agent, or Firm* — Astute IP Law Group

(57)　　　　ABSTRACT

A special-effect display method and apparatus, and a device and a medium are provided. The method includes: acquiring a photographed video image; determining position information of a recognition object on the basis of the photographed video image, and performing drawing according to the position information of the recognition object, so as to obtain a trajectory record image; performing superimposition processing on the trajectory record image and a preset special-effect material image, so as to obtain cell special-effect images; and performing transformation processing on the cell special-effect images, so as to generate a target special-effect image, and adding the target special-effect image to the photographed video image for displaying,
　　　　(Continued)

wherein the target special-effect image is an image formed by combining a plurality of cell special-effect images.

18 Claims, 6 Drawing Sheets

(51) Int. Cl.
|  |  |
| --- | --- |
| *G06T 5/50* | (2006.01) |
| *G06T 7/70* | (2017.01) |
| *G06T 11/23* | (2026.01) |

(52) U.S. Cl.
CPC .... *G06T 11/23* (2026.01); *G06T 2207/20221* (2013.01); *G06T 2207/30201* (2013.01)

(58) Field of Classification Search
USPC .......................................................... 345/629
See application file for complete search history.

(56) References Cited

U.S. PATENT DOCUMENTS

| | | | | |
| --- | --- | --- | --- | --- |
| 2016/0351170 | A1* | 12/2016 | Asente | G06T 11/203 |
| 2017/0132751 | A1* | 5/2017 | Shigeta | G06T 3/403 |
| 2019/0132642 | A1 | 5/2019 | Wang et al. | |
| 2020/0252553 | A1* | 8/2020 | Luo | H04N 23/611 |
| 2020/0380267 | A1 | 12/2020 | Lee | |
| 2020/0380660 | A1* | 12/2020 | Yu | G06T 7/70 |
| 2021/0027046 | A1 | 1/2021 | Liu et al. | |
| 2021/0090608 | A1* | 3/2021 | Zhang | G06V 20/46 |
| 2022/0076456 | A1* | 3/2022 | Kim | G06T 11/00 |
| 2022/0088477 | A1* | 3/2022 | Tham | G06T 7/70 |

FOREIGN PATENT DOCUMENTS

| | | | | | | |
| --- | --- | --- | --- | --- | --- | --- |
| CN | 105278794 | A | | 1/2016 | | |
| CN | 105574814 | A | | 5/2016 | | |
| CN | 105745608 | A | | 7/2016 | | |
| CN | 106792078 | A | | 5/2017 | | |
| CN | 108973509 | A | | 12/2018 | | |
| CN | 109068053 | A | | 12/2018 | | |
| CN | 109241956 | A | | 1/2019 | | |
| CN | 109688346 | A | | 4/2019 | | |
| CN | 109698914 | A | * | 4/2019 | ............. | H04N 5/262 |
| CN | 208993365 | U | | 6/2019 | | |
| CN | 111954055 | A | | 11/2020 | | |
| CN | 112929582 | A | | 6/2021 | | |
| JP | 2007079887 | A | | 3/2007 | | |
| JP | 7604669 | B2 | | 12/2024 | | |

OTHER PUBLICATIONS

The extended European search issued in European Application No. 22749151.1, dated Jun. 6, 2024.

Douyin APP: "Douyin APP Screenshots," "Two Screenshots Showing the Change in the No. of Comments on the Douyin APP video," "Spring Festival is Coming, Use this Window Paper-cutting Tool to Cut your Own Window Paper-cut", Jan. 26, 2021, 4 pages.

Douyin APP: "Window Paper-cutting Props," Douyin Historical Version V14.6.0, Jan. 26, 2021, 8 pages.

Office Action received for Singaporean Patent Application No. 11202305903X, mailed on Mar. 3, 2026, 11 pages.

* cited by examiner

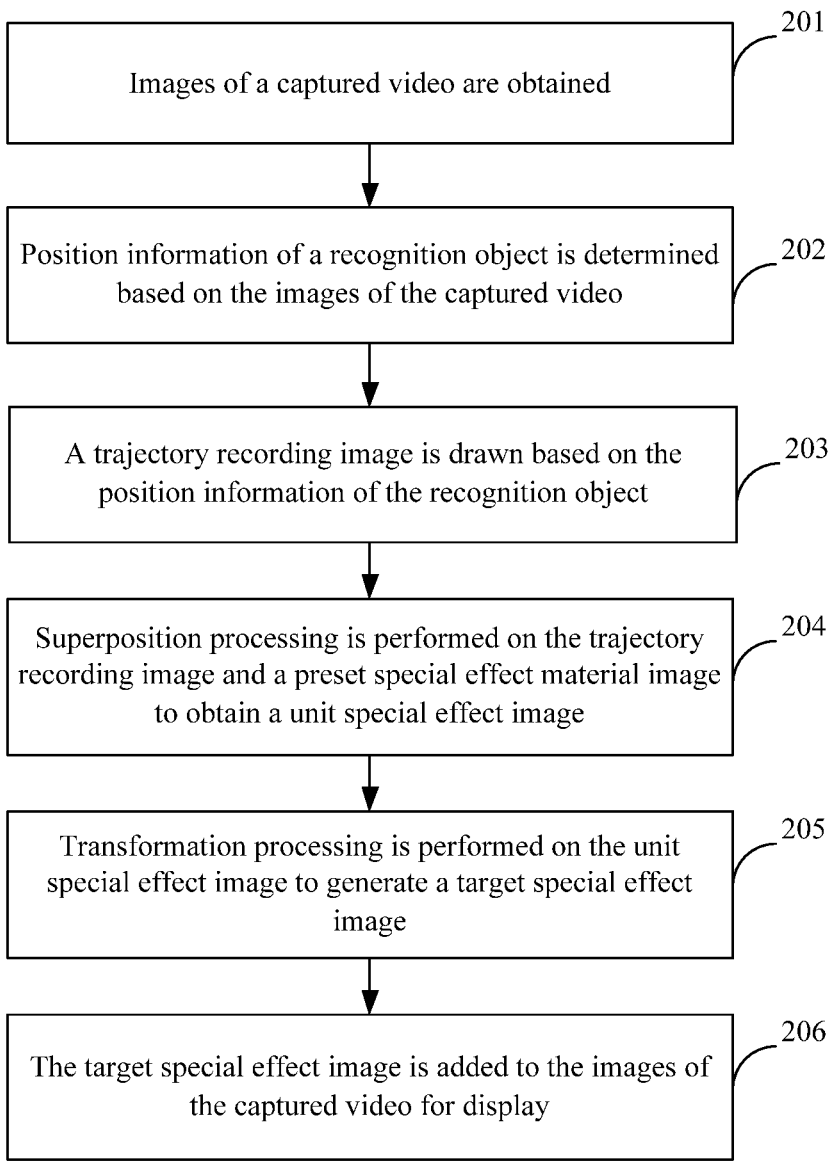

Images of a captured video are obtained    201

Position information of a recognition object is determined based on the images of the captured video    202

A trajectory recording image is drawn based on the position information of the recognition object    203

Superposition processing is performed on the trajectory recording image and a preset special effect material image to obtain a unit special effect image    204

Transformation processing is performed on the unit special effect image to generate a target special effect image    205

The target special effect image is added to the images of the captured video for display    206

Figure 5

SPECIAL-EFFECT DISPLAY METHOD AND APPARATUS, AND DEVICE AND MEDIUM

This application is a continuation of International Application No. PCT/CN2022/074919, filed on Jan. 29, 2022 which claims the priority to Chinese Patent Application No. 202110157069.5 titled "SPECIAL-EFFECT DISPLAY METHOD AND APPARATUS, AND DEVICE AND MEDIUM", filed on Feb. 4, 2021, both of which are incorporated herein by reference in their entireties.

TECHNICAL FIELD

The present disclosure relates to the field of internet technology, in particular to a special effect display method and apparatus, a device, and a medium.

BACKGROUND

With the continuous development of intelligent terminals and internet technology, the interaction between terminals and users is becoming increasingly diverse.

Terminals can provide various special effects to attract users. However, the current special effects lack richness and entertaining, and thus cannot meet users' needs for special effects.

SUMMARY

In order to solve or at least partially solve the above technical problems, a special effect display method and apparatus, a device, and a medium are provided according to the present disclosure.

A special effect display method is provided according to an embodiment of the present disclosure. The method includes:

obtaining images of a captured video;

determining position information of a recognition object based on the images of the captured video, and drawing a trajectory recording image based on the position information of the recognition object;

performing superposition processing on the trajectory recording image and a preset special effect material image to obtain a unit special effect image; and performing transformation processing on the unit special effect image to generate a target special effect image, and adding the target special effect image to the images of the captured video for display, where the target special effect image is combined by multiple unit special effect images.

A special effect display apparatus is provided according to an embodiment of the present disclosure. The apparatus includes:

an image obtaining module configured to obtain images of a captured video;

a trajectory recording module configured to determine position information of a recognition object based on the images of the captured video, and draw a trajectory recording image based on the position information of the recognition object;

a first special effect module configured to perform superposition processing on the trajectory recording image and a preset special effect material image to obtain a unit special effect image; and a second special effect module configured to perform transformation processing on the unit special effect image to generate a target special effect image, and add the target special effect image to the images of the captured video for display; where the target special effect image is combined by multiple unit special effect images.

An electronic device is provided according to an embodiment of the present disclosure. The electronic device includes: a processor; and a memory for storing instructions executable by the processor. The processor is configured to read the instructions from the memory and execute the instructions to implement the special effect display method according to the embodiments of the present disclosure.

A computer readable storage medium is provided according to an embodiment of the present disclosure. The storage medium stores a computer program for performing the special effect display method according to the embodiments of the present disclosure.

A computer program product is provided according to an embodiment of the present disclosure. The computer program product, when running on a computer, causes the computer to perform the special effect display method according to the embodiments of the present disclosure.

The technical solution according to the embodiments of the present disclosure has the following advantages compared to the conventional technology. In the special effect display solution according to the embodiments of the present disclosure, images of a captured video are obtained; position information of a recognition object is determined based on the images of the captured video, and a trajectory recording image is drawn based on the position information of the recognition object; superposition processing is performed on the trajectory recording image and a preset special effect material image to obtain a unit special effect image; transformation processing is performed on the unit special effect image to generate a target special effect image, and the target special effect image is added to the images of the captured video for display. The target special effect image is combined by multiple unit special effect images. By the above technical solution, the trajectory recording image is generated based on the position change of the recognition object in the images of the captured video. Then, the trajectory recording image and the special effect material image may be superimposed to obtain the unit special effect image, and a special effect image may be obtained by performing transformation processing on the unit special effect image. The special effect image may be displayed to the user, achieving the special effect display based on the user's actions. As the displayed special effect image is generated by combining multiple unit special effect images, the richness and entertaining of special effect display are improved, and thus the user's interactive experience is enhanced.

BRIEF DESCRIPTION OF THE DRAWINGS

The above and other features, advantages and aspects of the embodiments of the present disclosure will be more apparent in conjunction with the drawings and with reference to the following embodiments. The same or similar reference numerals throughout the drawings represent the same or similar elements. It should be understood that the drawings are schematic and the components and elements are unnecessarily drawn to scale.

FIG. 5 is a schematic flowchart of a special effect display method according to another embodiment of the present disclosure;

DETAILED DESCRIPTION OF EMBODIMENTS

Embodiments of the present disclosure will be described in detail below with reference to the accompanying drawings. Although the drawings show some embodiments of the present disclosure, it should be understood that the present disclosure can be implemented in various forms and should not be interpreted as limited to the embodiments described herein. Instead, the embodiments are provided for a more thorough and complete understanding of the present disclosure. It should be understood that the drawings and the embodiments in the present disclosure are for illustrative purpose only, and are not intended to limit the protection scope of the present disclosure.

It should be understood that the steps of the method according to the embodiments of the present disclosure may be performed in different orders, and/or be performed in parallel. In addition, the method embodiments may include an additional step and/or omit to perform the illustrated steps. The scope of the present disclosure is not limited in this regard.

The term "including" and variants thereof as used herein are open-ended includes, that is, "including but not limited to". The term "based on" means "based at least in part on." The term "an embodiment" means "at least one embodiment", the term "another embodiment" means "at least one another embodiment", and the term "some embodiments" means "at least some embodiments". Definitions of other terms are provided in the following description.

It should be noted that the concepts such as "first" and "second" mentioned in the present disclosure are used to distinguish different apparatus, modules or units, and are not used to limit an sequential order or interdependence of the functions performed by the apparatus, modules or units.

It should be noted that, the modifications such as "one" and "multiple" mentioned in the present disclosure are schematic rather than restrictive, and should be understood as "one or more" by those skilled in the art, otherwise explicitly illustrated in the context.

The names of messages or information exchanged between multiple apparatuses in the embodiments of the present disclosure are only for illustrative purposes, and are not intended to limit the scope of the messages or information.

Figure 1:
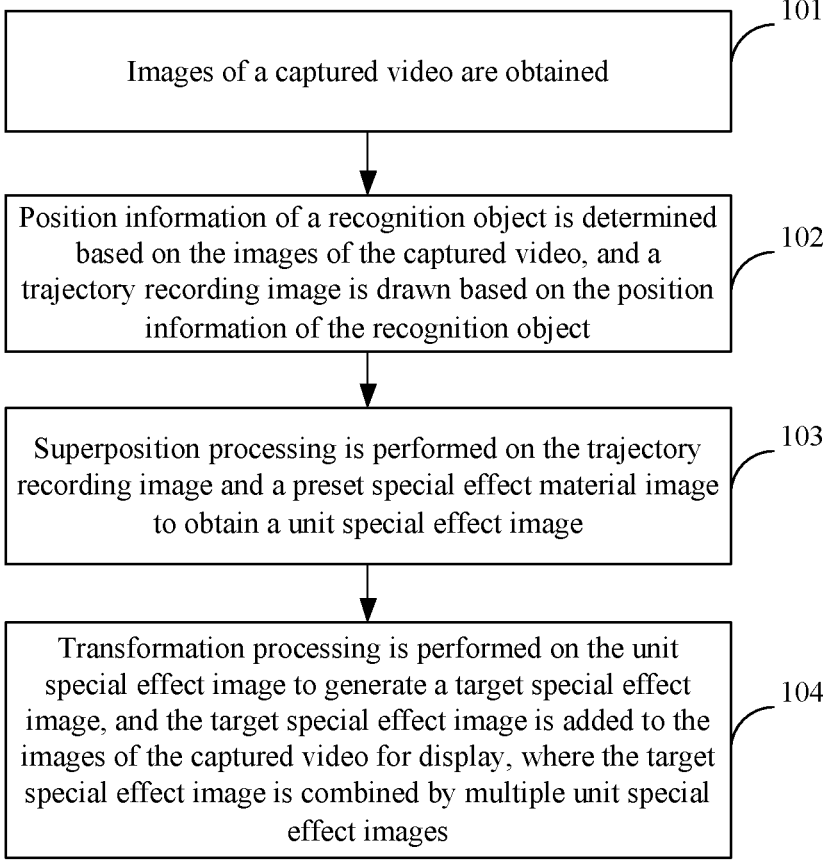
FIG. 1 is a schematic flowchart of a special effect display method according to an embodiment of the present disclosure.

FIG. 1 is a schematic flowchart of a special effect display method according to an embodiment of the present disclosure. The method may be performed by a special effect display apparatus. The special effect display apparatus may be implemented using software and/or hardware and may generally be integrated into an electronic device. As shown in FIG. 1, the method includes S101 to S104.

In Step 101, images of a captured video are obtained.

The images of the captured video are images including a part or all of user's body parts within a current image acquisition range. The images captured video may include user's face, head, limbs, and background and the like.

In an embodiment of the present disclosure, a client acquires and displays the images of the captured video through an image acquisition module, in response to a special effect display instruction from a user. The special effect display instruction refers to an instruction to start special effect display, which is generated by the user's triggering operation on a preset button. The mode of the triggering operation is not limited herein, such as clicking on a preset button. The preset button may be set in hardware or software manners. The special effect display instruction may also be generated based on a voice instruction inputted by a user. For example, after receiving a voice inputted by the user, it may be determined whether the voice is a preset voice. If the voice is determined to be a preset voice, a special effect display instruction is generated.

In Step 102, position information of a recognition object is determined based on the images of the captured video, and a trajectory recording image is drawn based on the position information of the recognition object.

The recognition object may be a preset body part of the user. For example, the recognition object may include a nose and eyes in a human face, and fingers, which can be set according to the actual situation. In an embodiment of the present disclosure, the recognition object being a preset part of a human face is taken as an example. The preset part may be any part of the face, such as a nose, a mouth, and eyes. The trajectory recording graph is an image used to record an action trajectory of the preset part of the user's face.

In an embodiment of the present disclosure, after obtaining the images of the captured video, the client detects a human face in the images of the captured video in an image recognition algorithm, and determines position information of the preset part of the face, that is, determines the position information of the recognition object. Then, the client draws a trajectory recording graph based on the position information of the recognition object. The position information of the recognition object may be coordinates of the recognition object in the images of the captured video, and the origin of the coordinates is determined based on the actual situation.

In an embodiment, the process of drawing the trajectory recording image based on the position information of the recognition object includes: creating a canvas, and drawing in the canvas circular areas at two positions corresponding to the recognition object based on the position information of the recognition object in the first and second frame images of the captured video; determining a target line connecting the two positions, and determining a trajectory area based on the target line, where a distance of points in the trajectory area to the target line is less than or equal to a radius of the circular area; setting transparencies of the two circular areas and the trajectory area to transparent to obtain the trajectory recording image. In an embodiment, the process of determining the trajectory area based on the target line includes: determining target points between the two positions; filtering and drawing the target points based on a distance of each target point to the target line, to obtain the trajectory area, where an angle between a first line corresponding to the target point and the target line and an angle between a second line corresponding to the target point and the target line are both acute angles, and the first line and the second line are lines respectively connecting the target point and the two positions.

The canvas is a foundation used to generate a trajectory recording image through drawing. Color and size of the canvas are not limited. For example, the canvas may be a black canvas. Specifically, the client determines the position information of the recognition object in each frame image of the captured video; and draws circular areas with a preset radius at two positions of the recognition object, based on the position information of the recognition object in the first and second frame images. The preset radius may be a brush radius in the case that the brush is a circular brush. Then, the client determines an angle between the first line corresponding to each point between the two positions and the target line and an angle between the second line corresponding to each point between the two positions and the target line, to determine points with two corresponding acute angles as target points; filters and draws target points with a distance to the target line less than or equal to the radius of the circular area, to obtain a trajectory area. The trajectory area may be a rectangular area. The two circular areas and a trajectory area obtained from the above process are an action drawing area of the recognition object in the first and second frame images. The transparency of the two circular areas and a trajectory area is set to transparent on the canvas, to obtain the trajectory recording image. In an embodiment, the two circular areas and the trajectory area may be filled with a preset color on the canvas to obtain the trajectory recording image. The preset color refers to a color different from the canvas color. For example, when the canvas is black, the preset color may be white.

In Step 103, superposition processing is performed on the trajectory recording image and a preset special effect material image to obtain a unit special effect image.

The special effect material image may be understood as a basic image used to generate a unit special effect image. The special effect material image may be regarded as an initial paper in analogy with paper-cuts. The special effect material image may be a sector diagram filled with a fixed color. The color, shape and angle of the sector diagram may be set according to the actual situation. For example, the special effect material image may be a red sector diagram with an angle of 30 degrees. The shape and size of the trajectory recording image may be the same as or different from those of the special effect material image, which will not be limited herein. The superposition processing is used to replace a background of the trajectory recording image with the special effect material image.

In an embodiment of the present disclosure, after obtaining a trajectory recording image, the client obtains the preset special effect material image and replaces the background of the trajectory recording image with the special effect material image to obtain a unit special effect image. Then, the unit special effect image may be displayed, and the trajectory recording area in the unit special effect image may be highlighted.

In Step 104, transformation processing is performed on the unit special effect image to generate a target special effect image, and the target special effect image is added to the images of the captured video for display, where the target special effect image is combined by multiple unit special effect images.

The target special effect image refers to a complete special effect image generated based on the unit special effect image, which may be obtained by combining multiple unit special effect images. In an embodiment of the present disclosure, taking the target special effect image being a special effect image of paper-cuts as an example, the target special effect image may be understood as a special effect image similar to paper-cuts obtained by paper cutting.

Transformation processing includes an operation for transforming the unit special effect image, which may include a first transformation operation or a second transformation operation. The first transformation operation includes a replication operation and a mirroring operation. The second transformation operation includes a rotation operation and a moving operation. The replication operation refers to an operation of making multiple identical images for the unit special effect image. The mirroring operation refers to an operation of making, for the unit special effect image, an image arranged in a reverse order relative to an axis interleaved with the unit special effect image or a plane interleaved with the unit special effect image. The rotation operation refers to rotating the unit special effect image at a certain angle. The transformation parameter corresponding to the transformation processing is adjustable. The transformation parameter includes at least one of replication times corresponding to the replication operation, a rotation angle corresponding to the rotation operation, an image position, and an image size. The dynamic control of transformation parameter may be achieved by developers, implementing a diversity of the generated target special effect images.

In the embodiment of the present disclosure, the superposition processing may be performed on the trajectory recording image and the preset special effect material image, to obtain the unit special effect image, and the transformation processing is performed on the unit special effect image to generate the target special effect image. The above superposition processing and transformation processing may be carried out synchronously, or the superposition processing is performed first and then the transformation processing is performed according to actual needs.

After acquiring the images of the captured video, the client displays the images of the captured video on an image display interface, and draws a trajectory recording image based on the position information of the reorganization object in the images of the captured video. A target special effect image is generated after the trajectory recording image is drawn, and the target special effect image is added to the images of the captured video in a set animation mode for display. The target special effect image may be superimposed on the images of the captured video to be fully displayed, and the images of the captured video are partially covered to highlight the target special effect image.

In an embodiment, a process of adding the target special effect image to the images of the captured video for display includes: adding the target special effect image to the images of the captured video in a set animation mode for display after the trajectory recording image is drawn. The set animation mode refers to a preset dynamic effect display mode, which may be set according to the actual situation. For example, the set animation mode includes: moving the target special effect image up a preset distance, and then displaying the target special effect one by one from a unit special effect image to both sides until the target special effect image is fully displayed. After the trajectory recording image is drawn, the generated target special effect image is inputted into a set animation program to display the target special effect image to the user in the set animation mode.

In the above solution, the target special effect image may be displayed in the preset animation mode after it is generated, so that users feel the target special effect image with animation effects, improving the entertaining of the special effect display.

Figure 2:
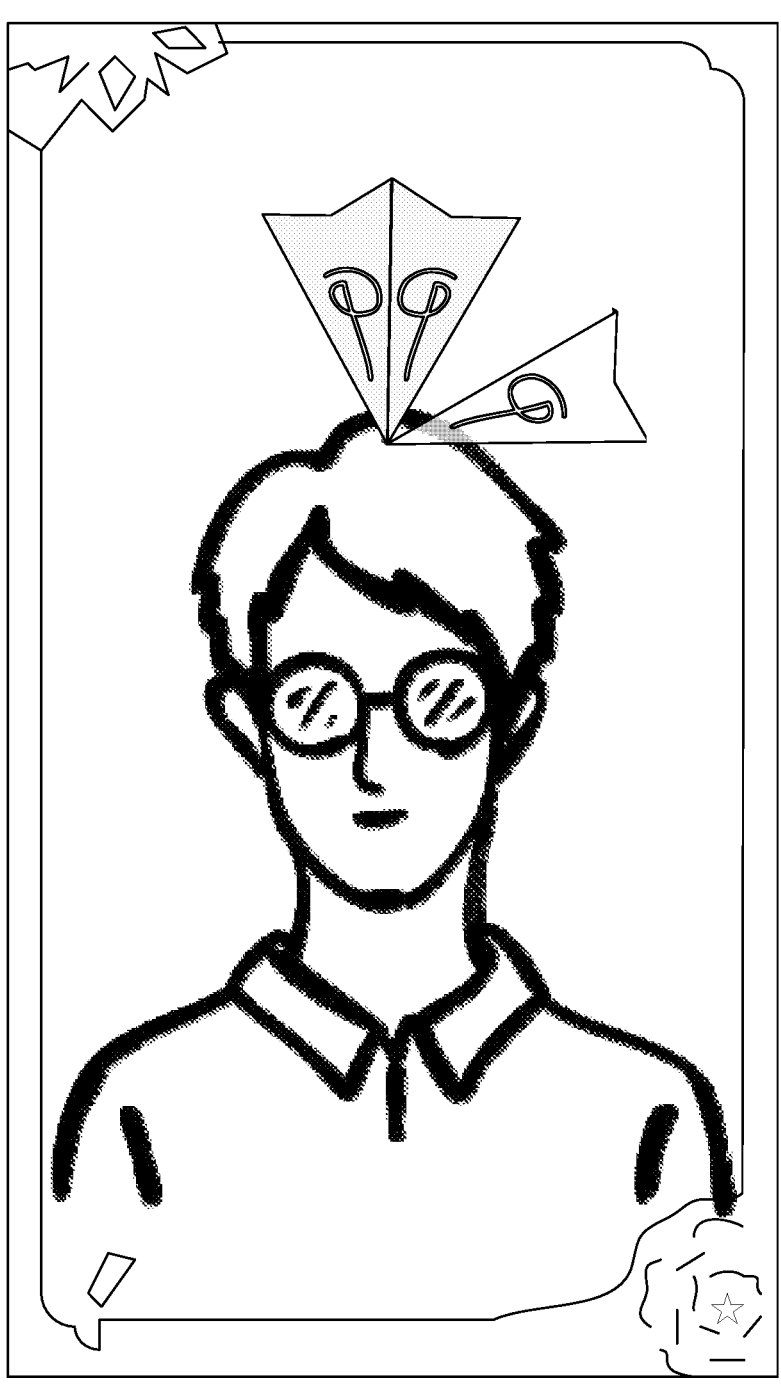
FIG. 2 is a schematic diagram showing special effect display according to an embodiment of the present disclosure.
Figure 3:
FIG. 3 is a schematic diagram showing special effect display according to another embodiment of the present disclosure.

As an example, FIG. 2 is a schematic diagram showing special effect display according to an embodiment of the present disclosure, and FIG. 3 is a schematic diagram showing special effect display according to another embodiment of the present disclosure. FIGS. 2 and 3 are two schematic diagrams showing a display process of the generated target special effect image in a set animation mode. As shown in FIG. 2, the target special effect image is a special effect image of paper-cut. Only the upper half of the paper-cut pieces is displayed in FIG. 2, and the displayed paper-cut pieces have different transparency. Other paper-cut pieces have not been displayed yet. As shown in FIG. 3, the target special effect image has been fully displayed in the set animation mode, and all paper-cut pieces have the same transparency. It can be understood that FIGS. 2 and 3 above show only examples of the target special effect image, and the parameter, such as the shape, size, position, of the target special effect image may be dynamically adjusted according to actual needs.

With the special effect display solution according to the embodiments of the present disclosure, images of a captured video are obtained; position information of a recognition object is determined based on the images of the captured video, and a trajectory recording image is drawn based on the position information of the recognition object. Superposition processing is performed on the trajectory recording image and a preset special effect material image to obtain a unit special effect image. Transformation processing is performed on the unit special effect image to generate a target special effect image, and the target special effect image is added to the images of the captured video for display. The target special effect image is combined by multiple unit special effect images. By the above technical solution, a trajectory recording image is generated based on the position change of the recognition object in the images of the captured video. Then, the trajectory recording image and the special effect material image may be superimposed to obtain the unit special effect image, and a special effect image may be obtained by performing transformation processing on the unit special effect image. The special effect image may be displayed to the user, achieving the special effect display based on the user's actions. As the displayed special effect image is generated by combining multiple unit special effect images, the richness and entertaining of special effect display are improved, and thus the user's interactive experience is enhanced.

In some embodiments, the special effect display method may further include: displaying the unit special effect image in real-time on the images of the captured video in the process of drawing the trajectory recording image. In an embodiment, the process of displaying the unit special effect image in real-time in the process of drawing the trajectory recording image may include: setting transparency of other areas in the target special effect image except the unit special effect image to transparent in the process of drawing the trajectory recording image, to obtain a special effect image to be displayed; superimposing the special effect image to be displayed on the images of the captured video for display.

In the process of drawing the trajectory recording image, superposition processing is performed on the trajectory recording image and special effect material image in real-time to generate the unit special effect image, and the unit special effect image is displayed in real-time on the images of the captured video. In the real-time superposition processing, a complete trajectory recording image is superposed with the special effect material image. Alternatively, an image of change in the action trajectory area of a real-time current frame image and a previous frame image in the trajectory recording image is be superposed with the special effect material image. Moreover, when the unit special effect image is displayed in real-time, as the target special effect image is obtained by combining multiple unit special effect images, the transparency of the area in the target special effect image except the unit special effect image is set to transparent to obtain the special effect image to be displayed. Only one unit-special effect image in the special effect image to be displayed is opaque, and the special effect image to be displayed is superimposed on the images of captured video for display. The transparency for opaque unit-special effect image is not limited, for example, the transparency may be set to 50%.

Figure 4:
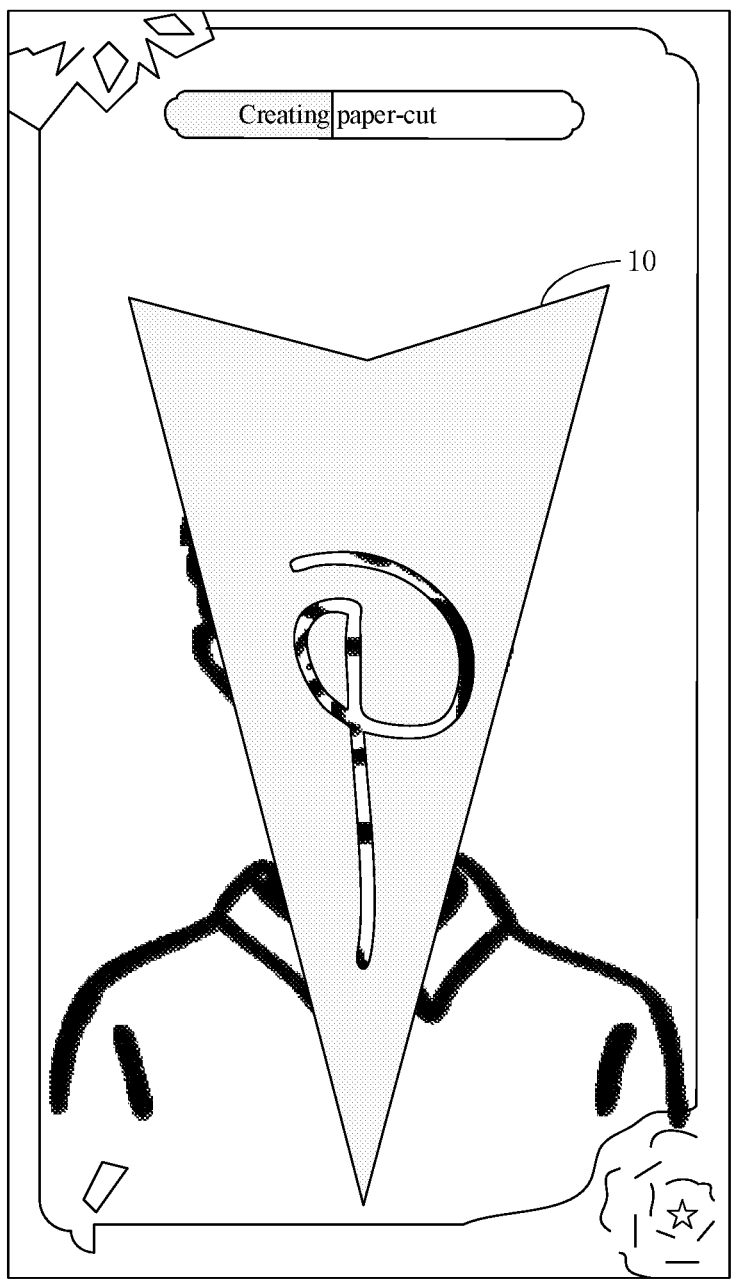
FIG. 4 is a schematic diagram showing special effect display according to another embodiment of the present disclosure.

As an example, FIG. 4 is a schematic diagram showing special effect display according to another embodiment of the present disclosure. FIG. 4 shows a schematic diagram of an image display interface in the process of generating the target special effect. In FIG. 4, only a unit special effect image 10 is shown, and the unit special effect image 10 is superimposed on the image of the captured video for display. A transparent action trajectory recording area generated based on user actions is shown in the unit special effect image 10. This area constantly changes with user actions. A progress bar for generating the special effect image may be display at the top of the image display interface in FIG. 4. The progress bar continues to advance with time and stop until the preset time is reached and the progress bar is filled. In the image display interface shown in FIG. 4, atmosphere effect elements may also displayed on interface borders to match the current special effect image, enhancing the user's immersive experience.

In the above solution, real-time display is performed in the process of generating the special effect image, so that users can feel in real time the changes in special effects with the action change, further improving the richness and entertaining of the special effect display, and enhancing the user's interactive experience.

In some embodiments, the special effect display method according to an embodiment of the present disclosure may further include: receiving a recording instruction from the user, and recording a special effect video for the processes of generating and displaying the target special effect image. The recording instruction is an instruction to perform video recording on the target special effect image. The recording instruction includes the special effect display instruction in the above embodiment. The client generates a recording instruction in response to a triggering operation of the user on a recording button, and then performs the process of generating the target special effect image mentioned above, and records the processes of generating and displaying the target special effect image to obtain a special effect video. The recording time may be a fixed time, which may be set according to the actual situation. For example, the fixed time may be 15 seconds.

In the above solution, it supports users to perform video recording on the processes of generating and displaying the target special effect image, so that users can perform further video sharing, downloading, and other operations, further improving the user's interactive experience.

In some embodiments, the special effect display method according to an embodiment of the present disclosure may further include: controlling the generation and display of the target special effect image based on a timestamp in the process of recording the special effect video. In an embodiment, in the process of recording the special effect video, the generation step of the target special effect image is performed, and the generation step ends when a preset time-stamp is reached. Then, the target special effect image is displayed. The advantage of this setting is that a possible lag caused by the generation and display of the target special effect image in units of frame is avoided, so that the target special effect image may be displayed within the preset recording time, further improving the display effect of the special effects.

FIG. 5 is a schematic flowchart of a special effect display method according to another embodiment of the present disclosure. Based on the above embodiment, the present embodiment further optimizes the special effect display method described above. As shown in FIG. 5, the method includes Step 201 to Step 206.

In Step 201, images of a captured video are obtained.

In Step 202, position information of a recognition object is determined based on the images of the captured video.

The recognition object is a preset part of a human face.

In Step 203, a trajectory recording image is drawn based on the position information of the recognition object.

In an embodiment, a process of drawing a trajectory recording image based on the position information of the recognition object includes: creating a canvas, and drawing in the canvas circular areas at two positions corresponding to the recognition object based on the position information of the recognition object in the first and second frame images of the captured video; determining a target line connecting the two positions, and determining a trajectory area based on the target line, where a distance of each point in the trajectory area to the target line is less than or equal to a radius of the circular area; setting transparencies of the two circular areas and the trajectory area to transparent to obtain the trajectory recording image.

In an embodiment, a process of determining a trajectory area based on the target line includes: determining a target point between the two positions; filtering and drawing the target point based on a distance of the target point to the target line, to obtain the trajectory area, where an angle between a first line corresponding to the target point and the target line and an angle between a second line corresponding to the target point and the target line are both acute angles, and the first line and the second line are lines respectively connecting the target point and the two positions.

In Step 204, superposition processing is performed on the trajectory recording image and a preset special effect material image to obtain a unit special effect image.

Superposition processing is used to replace a background of the trajectory recording image with the special effect material image.

In Step 205, transformation processing is performed on the unit special effect image to generate a target special effect image.

The target special effect image is a special effect image of paper-cut. The transformation processing includes a first transformation operation or a second transformation operation. The first transformation operation includes a replication operation and a mirroring operation. The second transformation operation includes a rotation operation and a moving operation. A transformation parameter corresponding to the transformation processing is adjustable. The transformation parameter includes at least one of replication times corresponding to the replication operation, a rotation angle corresponding to the rotation operation, an image position, and an image size.

The special effect display method in an embodiment of the present disclosure may further include: displaying the unit special effect image in real-time on the images of the captured video in the process of drawing the trajectory recording image. In an embodiment, the displaying the unit special effect image in real-time in the process of drawing the trajectory recording image includes: setting transparency of other areas in the target special effect image except the unit special effect image to transparent in the process of drawing the trajectory recording image, to obtain a special effect image to be displayed; superposing the special effect image to be displayed on the images of the captured video for display.

A method of implementing the target special effect image may include the following steps. A black canvas is created, that is, a texture map is generated and the actual texture map coordinates of the special effect material image are restored. Drawing is performed on the black canvas based on the user's actions, that is, a current point in a current frame and a previous point in a previous frame are determined (in the initial state, the two points are the same). Circles with a brush radius (in the case of a circular brush) are created. The target points between two points are filtered out and drawn, to obtain two circular areas and a rectangular area as the area drawn from the previous frame to the current frame, where a distance of the target points to the line is less than or equal to a length of the brush radius. An angle between the connection line of the target point and the current point and the connection line of the current point and the previous point, and an angle between the connection line of the target point and the previous point and the connection line of the current point and the previous point, are both acute angles. Finally, values are assigned to the points in these areas to obtain a black and white image, in which the white area represents the drawn part. The image is transferred into a functional module of the general special effect algorithm. The special effect material image is transferred to the render cache and is obtained through a functional module of general special effect algorithm. The actual texture map coordinates are restored, and an interface at a customized position and with a customized size and rotation angle is retained, a varying array is established, and the established varying array is repeated and stored, specifically repeated 11 times to obtain 12 varying arrays. Superposition processing may be performed on the previous black and white image and the special effect material image subject to processes such as replication in the rendering cache and rotation. If some pixels of special effect material image are white at the position of the black and white image, the pixels become transparent on the material canvas.

In Step 206, the target special effect image is added to the images of the captured video for display.

The target special effect image is combined by multiple unit special effect images.

In an embodiment, adding the target special effect image to the images of the captured video for display includes: adding the target special effect image to the images of the captured video in a set animation mode for display after the trajectory recording image is drawn.

With the special effect display solution according to the embodiments of the present disclosure, images of a captured video are obtained; position information of a recognition object is determined based on the images of the captured video, and a trajectory recording image is drawn based on the position information of the recognition object. Superposition processing is performed on the trajectory recording image and a preset special effect material image to obtain a unit special effect image. Transformation processing is performed on the unit special effect image to generate a target special effect image, and the target special effect image is added to the images of the captured video for display. The target special effect image is combined by multiple unit special effect images. By the above technical solution, a trajectory recording image is generated based on the position change of the recognition object in the images of the captured video. Then, the trajectory recording image and the special effect material image may be superimposed to obtain the unit special effect image, and a special effect image may be obtained by performing transformation processing on the unit special effect image. The special effect image may be displayed to the user, achieving the special effect display based on the user's actions. As the displayed special effect image is generated by combining multiple unit special effect images, the richness and entertaining of special effect display are improved, and thus the user's interactive experience is enhanced.

Figure 6:
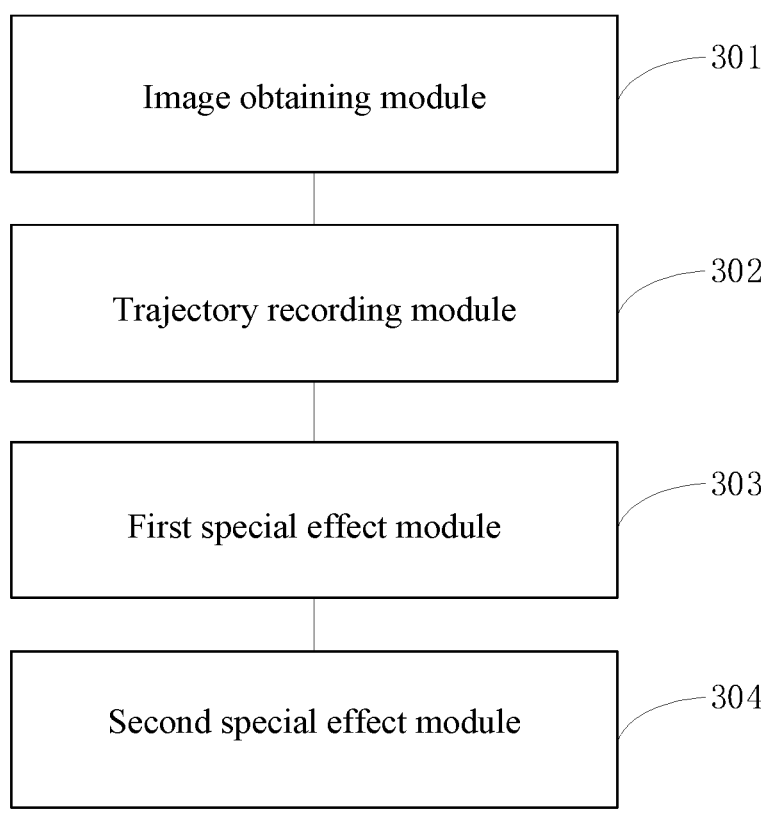
FIG. 6 is a schematic structural diagram of a special effect display apparatus according to an embodiment of the present disclosure.

FIG. 6 is a schematic structural diagram of a special effect display apparatus according to an embodiment of the present disclosure. The apparatus may be implemented by software and/or hardware, which may generally be integrated into an electronic device. As shown in FIG. 6, the apparatus may include: an image obtaining module 301, a trajectory recording module 302, a first special effect module 303 and a second special effect module 304.

The image obtaining module 301 is configured to obtain images of a captured video.

The trajectory recording module 302 is configured to determine position information of a recognition object based on the images of the captured video, and draw a trajectory recording image based on the position information of the recognition object.

The first special effect module 303 is configured to perform superposition processing on the trajectory recording image and a preset special effect material image to obtain a unit special effect image.

The second special effect module 304 is configured to perform transformation processing on the unit special effect image to generate a target special effect image, and add the target special effect image to the images of the captured video for display, where the target special effect image is combined by multiple unit special effect images.

In an embodiment, the trajectory recording module 302 is specifically configured to: create a canvas, and draw in the canvas circular areas at two positions corresponding to the recognition object based on the position information of the recognition object in first and second frame images of the captured video; determine a target line connecting the two positions, and determine a trajectory area based on the target line, where a distance of each point in the trajectory area to the target line is less than or equal to a radius of the circular area; set transparencies of the two circular areas and the trajectory area to transparent to obtain the trajectory recording image.

In an embodiment, the trajectory recording module 302 is further configured to: determine a target point between the two positions, filter out and draw the target point based on a distance of the target point and the target line, to obtain the trajectory area, where an angle between a first line corresponding to the target point and the target line and an angle between a second line corresponding to the target point and the target line are both acute angles, and the first line and the second line are lines respectively connecting the target point and two positions.

In an embodiment, the superposition processing is used to replace a background of the trajectory recording image with the special effect material image.

In an embodiment, the transformation processing includes a first transformation operation or a second transformation operation. The first transformation operation includes a replication operation and a mirroring operation. The second transformation operation includes a rotation operation and a moving operation.

In an embodiment, a transformation parameter corresponding to the transformation processing is adjustable. The transformation parameter includes at least one of replication times corresponding to the replication operation, a rotation angle corresponding to the rotation operation, an image position, and an image size.

In an embodiment, the apparatus further includes: a real-time display module configured to display the unit special effect image in real-time on the images of the captured video in the process of drawing the trajectory recording image.

In an embodiment, the real-time display module is further is configured to: set transparency of other areas in the target special effect image except the unit special effect image to transparent in the process of drawing the trajectory recording image, to obtain a special effect image to be displayed, and superpose the special effect image to be displayed on the images of the captured video for display.

In an embodiment, the second special effect module 304 is further configured to add the target special effect image to the images of the captured video in a set animation mode for display, after the trajectory recording image is drawn.

In an embodiment, the recognition object is a preset part of a human face. The target special effect image is a special effect image of paper-cut.

The special effect display apparatus according to the embodiment of the present disclosure can perform the special effect display method according to any one embodiment of the present disclosure, and has corresponding functional modules and beneficial effects for performing the method.

A computer program product including computer programs/instructions is provided according to the embodiment of the present disclosure. The computer programs/instructions, when executed by a processor, cause the processor to perform the special effect display method according to any one embodiment of the present disclosure.

Figure 7:
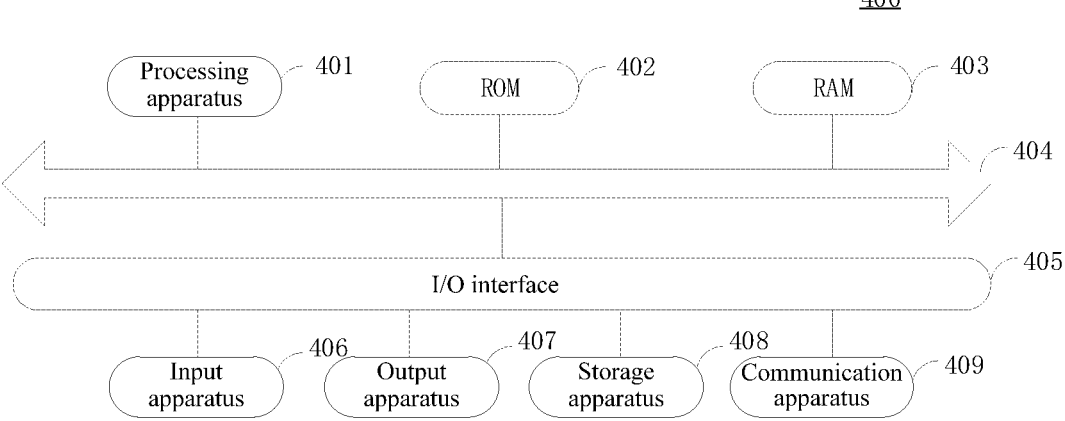
FIG. 7 is a schematic structural diagram of an electronic device according to an embodiment of the present disclosure.

FIG. 7 is a schematic structural diagram of an electronic device according to an embodiment of the present disclosure. Reference is made to FIG. 7, which shows a schematic structural diagram of an electronic device 400 suitable for implementing the embodiments of the present disclosure. The electronic device 400 in the embodiments of the present disclosure may include, but not limited to, mobile terminals such as a mobile phone, a notebook computer, a digital broadcast receiver, a personal digital assistance (PDA), a portable android device (PAD), a portable media player (PMP) and a vehicle terminal (such as a vehicle navigation terminal); and fixed terminals such as digital television (TV) and a desktop computer. The electronic device shown in FIG. 7 is only exemplary, and should not indicate any limitation to the function and application scope of the embodiments of the present disclosure.

As shown in FIG. 7, the electronic device 400 may include a processing apparatus (such as a central processing unit or a graphics processor) 401, which may execute various appropriate operations and processing based on a program stored in a Read Only Memory (ROM) 402 or a program loaded from a storage apparatus 408 into a Random Access Memory (RAM) 403. The RAM 403 is further configured to store various programs and data required by the electronic device 400. The processing apparatus 401, the ROM 402 and the RAM 403 are connected to each other through a bus 404. An Input/output (I/O) interface 405 is also connected to the bus 404.

Generally, the I/O interface 405 may be connected to: an input apparatus 406, such as a touch screen, a touch panel, a keyboard, a mouse, a camera, a microphone, an accelerometer, and a gyroscope; an output apparatus 407, such as a liquid crystal display (LCD), a speaker, and a vibrator; a storage apparatus 408 such as a magnetic tape and a hard disk; and a communication apparatus 409. The communication apparatus 409 enables wireless or wired communication between the electronic device 400 and other devices for data exchanging. Although FIG. 7 shows an electronic device 400 having various apparatus, it should be understood that the illustrated apparatus are not necessarily required to all be implemented or embodied. Alternatively, more or fewer apparatuses may be implemented or included.

Particularly, according to the embodiments of the present disclosure, the process described above in conjunction with flowcharts may be implemented as a computer software program. For example, a computer program product is further provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 409, or installed from the storage apparatus 408, or installed from the ROM 402. When the computer program is executed by the processing apparatus 401, the functions defined in the special effect display method according to the embodiment of the present disclosure are performed.

It should be noted that, the computer readable medium mentioned in the present disclosure may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. Specific examples of the computer readable storage medium may include, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any suitable combination thereof. In the embodiment of the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may also be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: a wire, an optical cable, RF (radio frequency) and the like, or any proper combination thereof.

In some embodiments, the client and the server may perform communication using any currently known or future developed network protocol such as HTTP (HyperText Transfer Protocol), and may be interconnected with any form or medium of digital data communication (for example, a communication network). Examples of a communication network include a local area network ("LAN"), a wide area network ("WAN"), the Internet Work (for example, the Internet), and a peer-to-peer network (for example, an ad hoc peer-to-peer network), as well as any currently known network or a future developed network.

The computer readable medium may be incorporated in the electronic device, or may exist alone without being assembled into the electronic device.

The computer-readable medium mentioned above carries one or more programs. One or more programs, when executed by the electronic device, cause the electronic device to: obtain images of a captured video; determine position information of a recognition object based on the images of the captured video, and draw a trajectory recording image based on the position information of the recognition object; perform superposition processing on the trajectory recording image and a preset special effect material image to obtain a unit special effect image; perform transformation processing on the unit special effect image to generate a target special effect image, and add the target special effect image to the images of the captured video for display, where the target special effect image is combined by multiple unit special effect images.

Computer program code for performing operations of the present disclosure may be written in one or more programming languages, including but not limited to object-oriented programming languages, such as Java, Smalltalk, and C++, and conventional procedural programming languages, such as the "C" language or similar programming languages. The program code may be executed entirely on a user computer, partially on the user computer, as a standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flow charts and block charts in the drawings illustrate the architecture, functions and operations that can be implemented by the system, method and computer program produce according to the embodiments of the present disclosure. In this regard, each block in the flowchart or the block diagram may represent a module, a program segment, or a part of code. The module, the program segment, or the part of code includes one or more executable instructions used for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the block in the block diagram and/or flowchart and a combination of the blocks in the block diagram and/or flowchart may be implemented by a dedicated hardware-based system that performs specified functions or actions, or may be realized by a combination of dedicated hardware and computer instructions.

The units involved in the embodiments of the present disclosure may be implemented in a software manner, and may also be implemented in a hardware manner. The name of the unit does not constitute a limitation of the unit under any circumstances.

The functions described herein above may be performed, at least in part, by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the context of the present disclosure, the machine readable medium may be a tangible medium that may contain or store a program, and the program may be used by or in connection with an instruction execution system, apparatus or device. The machine readable medium may be a machine readable signal medium or a machine readable storage medium. The machine readable medium may include, but is not limited to, system, an apparatus, or a device in an electronic, magnetic, optical, electromagnetic, infrared, or semi-conductive form, or any suitable combination thereof. More specific examples of the machine readable storage medium may include, one or more wire based electrical connections, a portable computer disk, a hard disk, a random access memory (RAM), a read-only memory (ROM), an erasable programmable read-only memory (EPROM or Fast flash memory), an optical fiber, a portable compact disc read-only memory (CD-ROM), an optical storage device, a magnetic storage device or any suitable combination thereof.

According to one or more embodiments of the present disclosure, a special effect method is provided according to one or more embodiments of the present disclosure. The method includes:

obtaining images of a captured video;

determining position information of a recognition object based on the images of the captured video, and drawing a trajectory recording image based on the position information of the recognition object;

performing superposition processing on the trajectory recording image and a preset special effect material image to obtain a unit special effect image; and performing transformation processing on the unit special effect image to generate a target special effect image, and adding the target special effect image to the images of the captured video for display, where the target special effect image is combined by multiple unit special effect images.

According to one or more embodiments of the present disclosure, in the special effect display method according to the embodiments of the present disclosure, the drawing a trajectory recording image based on the position information of the recognition object includes:

creating a canvas, and drawing in the canvas circular areas at two positions corresponding to the recognition object based on the position information of the recognition object in first and second frame images of the captured video;

determining a target line connecting the two positions, and determining a trajectory area based on the target line, wherein a distance of each point in the trajectory area to the target line is less than or equal to a radius of the circular area; and setting transparencies of the two circular areas and the trajectory area to transparent, to obtain the trajectory recording image.

According to one or more embodiments of the present disclosure, in the special effect display method according to the embodiments of the present disclosure, the determining a trajectory area based on the target line includes:

determining a target point between the two positions, filtering out and drawing the target point based on a distance of the target point to the target line, to obtain the trajectory area, where an angle between a first line corresponding to the target point and the target line and an angle between a second line corresponding to the target point and the target line are both acute angles, and the first line and the second line are lines respectively connecting the target point and the two positions.

According to one or more embodiments of the present disclosure, in the special effect display method according to the embodiments of the present disclosure, the superposition processing is used to replace a background of the trajectory recording image with the special effect material image.

According to one or more embodiments of the present disclosure, in the special effect display method according to the embodiments of the present disclosure, the transformation processing included a first transformation operation or a second transformation operation, where the first transformation operation includes a replication operation and a mirroring operation, and the second transformation operation includes a rotation operation and a moving operation.

According to one or more embodiments of the present disclosure, in the special effect display method according to the embodiments of the present disclosure, a transformation parameter corresponding to the transformation processing is adjustable, and the transformation parameter includes at least one of replication times corresponding to the replication operation, a rotation angle corresponding to the rotation operation, an image position, and an image size.

According to one or more embodiments of the present disclosure, the special effect display method according to the embodiments of the present disclosure may further includes:

displaying the unit special effect image in real-time on the images of the captured video in a process of drawing the trajectory recording image.

According to one or more embodiments of the present disclosure, in the special effect display method according to the embodiments of the present disclosure, the displaying the unit special effect image in real-time in a process of drawing the trajectory recording image includes:

setting transparency of other areas in the target effect image except the unit special effect image to transparent in the process of drawing the trajectory recording image, to obtain a special effect image to be displayed; and superposing the special effect image to be displayed on the images of the captured video for display.

According to one or more embodiments of the present disclosure, in the special effect display method according to the embodiments of the present disclosure, the adding the target special effect image to the images of the captured video for display includes:

adding the target special effect image to the images of the captured video in a set animation mode for display, after the trajectory recording image is drawn.

According to one or more embodiments of the present disclosure, in the special effect display method according to the embodiments of the present disclosure, the recognition object is a preset part of a human face, and the target special effect image is a special effect image of paper-cut.

A special effect display apparatus is provided according to one or more embodiments of the present disclosure. The special effect display apparatus includes:

an image obtaining module configured to obtain images of a captured video;

a trajectory recording module configured to determine position information of a recognition object based on the images of the captured video, and draw a trajectory recording image based on the position information of the recognition object;

a first special effect module configured to perform superposition processing on the trajectory recording image and a preset special effect material image to obtain a unit special effect image; and a second special effect module configured to perform transformation processing on the unit special effect image to generate a target special effect image, and add the target special effect image to the image of the captured video for display, where the target special effect image is combined by multiple unit special effect images.

According to one or more embodiments of the present disclosure, in the special effect display apparatus according to the embodiments of the present disclosure, the trajectory recording module is further configured to:

create a canvas, and draw in the canvas circular areas at two positions corresponding to the recognition object based on the position information of the recognition object in first and second frame images of the captured video;

determine a target line connecting the two positions, and determine a trajectory area based on the target line, where a distance of each point in the trajectory area to the target line is less than or equal to a radius of the circular area; and set transparencies of the two circular areas and the trajectory area to transparent to obtain the trajectory recording image.

According to one or more embodiments of the present disclosure, in the special effect display apparatus according to the embodiments of the present disclosure, the trajectory recording module is further configured to:

determine a target point between the two positions, filter out and draw the target point based on a distance of the target point to the target line, to obtain the trajectory area, where an angle between a first line corresponding to the target point and the target line and an angle between a second line corresponding to the target point and the target line are both acute angles, and the first line and the second line are lines respectively connecting the target point and the two positions.

According to one or more embodiments of the present disclosure, in the special effect display apparatus according to the embodiments of the present disclosure, the superposition processing is used to replace a background of the trajectory recording image with the special effect material image.

According to one or more embodiments of the present disclosure, in the special effect display apparatus according to the embodiments of the present disclosure, the transformation processing includes a first transformation operation or a second transformation operation, where the first transformation operation includes a replication operation and a mirroring operation, and the second transformation operation includes a rotation operation and a moving operation.

According to one or more embodiments of the present disclosure, in the special effect display apparatus according to the embodiments of the present disclosure, a transformation parameter corresponding to the transformation processing is adjustable, and the transformation parameter includes at least one of replication times corresponding to the replication operation, a rotation angle corresponding to the rotation operation, an image position, and an image size.

According to one or more embodiments of the present disclosure, the special effect display apparatus according to the embodiments of the present disclosure further includes:

a real-time display module configured to display the unit special effect image in real-time on the images of the captured video, in a process of drawing the trajectory recording image.

According to one or more embodiments of the present disclosure, in the special effect display apparatus according to the embodiments of the present disclosure, the real-time display module is further configured to:

set transparency of other areas in the target special effect image except the unit special effect image to transparent in the process of drawing the trajectory recording image, to obtain a special effect image to be displayed; and superpose the special effect image to be displayed on the images of the captured video for display.

According to one or more embodiments of the present disclosure, in the special effect display apparatus according to the embodiments of the present disclosure, the second special effect module is further configured to:

add the target special effect image to the images of the captured video in a set animation mode for display, after the trajectory recording image is drawn.

According to one or more embodiments of the present disclosure, in the special effect display apparatus according to the embodiments of the present disclosure, the recognition object is a preset part of a human face, and the target special effect image is a special effect image of paper-cuts.

An electronic device is provided according to one or more embodiments of the present disclosure. The electronic device includes:

a processor; and a memory for storing instructions executable by the processor.

The processor is configured to read the instructions from the memory and execute the instructions to implement the special effect display method according to any one of the embodiments of the present disclosure.

A computer readable storage medium is provided according to one or more embodiments of the present disclosure. The storage medium stores a computer program for performing the special effect display method according to any one of the embodiments of the present disclosure.

A computer program product is provided according to one or more embodiments of the present disclosure. The computer program product, when running on a computer, causes the computer to perform the special effect display method according to the embodiments of the present disclosure.

The above description includes merely preferred embodiments of the present disclosure and explanations of technical principles used. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure.

For example, a technical solution formed by interchanging the above features and technical features having similar functions as disclosed, but not limited to, in the present disclosure with each other is also covered with the scope of the present disclosure.

In addition, although the above operations are described in a specific order, it should not be understood that these operations are required to be performed in the specific order or performed in a sequential order. Under certain circumstances, multitasking and parallel processing may be advantageous. Similarly, although multiple implementation details are included in the above descriptions, the details should not be interpreted as limitations to the scope of the present disclosure. Some features described in the context of a separate embodiment may be implemented in combination in a separate embodiment. Conversely, the features described in in the context of a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. Instead, the specific features and actions described above are merely exemplary forms of implementing the claims.

The invention claimed is:

1. A special effect display method, comprising:
obtaining images of a captured video;
determining position information of a recognition object based on the images of the captured video, and drawing a trajectory recording image based on the position information of the recognition object;
performing superposition processing on the trajectory recording image and a preset special effect material image to obtain a unit special effect image, wherein the unit special effect image comprises the trajectory recording image and the preset special effect material image used as a background of the trajectory recording image;
performing transformation operation to the unit special effect image to obtain at least one transformed unit special effect image; using the unit special effect image and the at least one transformed unit special effect image as a plurality of display units; combining the plurality of display units to generate a target special effect image comprising the plurality of display units; and
adding the target special effect image to the images of the captured video, to display the target special effect image in an animation mode,
wherein the plurality of display units are displayed in different transparencies in a process of displaying the target special effect image, and the plurality of display units are displayed in a same transparency in response to the target special effect image being displayed fully.

2. The method according to claim 1, wherein the superposition processing is used to replace a background of the trajectory recording image with the special effect material image.

3. The method according to claim 1, further comprising:
displaying the target special effect image in real-time on the images of the captured video in a process of drawing the trajectory recording image.

4. The method according to claim 3, wherein the displaying the target special effect image in real-time in a process of drawing the trajectory recording image comprises:

setting transparency of other areas in the target special effect image except the plurality of display units to transparent in the process of drawing the trajectory recording image, to obtain a special effect image to be displayed; and
superposing the special effect image to be displayed on the images of the captured video for display.

5. The method according to claim 1, wherein the recognition object is a preset part of a human face, and the target special effect image is a special effect image of paper-cut.

6. The method according to claim 1, wherein the drawing a trajectory recording image based on the position information of the recognition object comprises:
creating a canvas, and drawing in the canvas circular areas at two positions corresponding to the recognition object based on the position information of the recognition object in first and second frame images of the captured video;
determining a target line connecting the two positions, and determining a trajectory area based on the target line, wherein a distance of each point in the trajectory area to the target line is less than or equal to a radius of the circular area; and
setting transparencies of the two circular areas and the trajectory area to transparent, to obtain the trajectory recording image.

7. The method according to claim 6, wherein the determining a trajectory area based on the target line comprises:
determining a target point between the two positions, filtering out and drawing the target point based on a distance of the target point to the target line, to obtain the trajectory area, wherein an angle between a first line corresponding to the target point and the target line and an angle between a second line corresponding to the target point and the target line are both acute angles, and the first line and the second line are lines respectively connecting the target point and the two positions.

8. The special effect display method according to claim 1, wherein the transformation processing comprises a first transformation operation or a second transformation operation, wherein the first transformation operation comprises a replication operation and a mirroring operation, and the second transformation operation comprises a rotation operation and a moving operation.

9. The method according to claim 8, wherein at least one of replication times corresponding to the replication operation, a rotation angle corresponding to the rotation operation, an image position, or an image size is adjustable.

10. An electronic device, comprising:
a processor; and
a memory for storing instructions executable by the processor;
wherein the processor is configured to read the instructions from the memory and execute the instructions to:
obtain images of a captured video;
determine position information of a recognition object based on the images of the captured video, and draw a trajectory recording image based on the position information of the recognition object;
perform superposition processing on the trajectory recording image and a preset special effect material image to obtain a unit special effect image, wherein the unit special effect image comprises the trajectory recording image and the preset special effect material image used as a background of the trajectory recording image;

perform transformation operation to the unit special effect image to obtain at least one transformed unit special effect image; use the unit special effect image and the at least one transformed unit special effect image as a plurality of display units; combine the plurality of display units to generate a target special effect image, and add the target special effect image to the images of the captured video, to display the target special effect image in an animation mode, wherein the plurality of display units are displayed in different transparencies in a process of displaying the target special effect image, and the plurality of display units are displayed in a same transparency in response to the target special effect image being displayed fully.

11. The electronic device according to claim 10, wherein the superposition processing is used to replace a background of the trajectory recording image with the special effect material image.

12. The electronic device according to claim 10, wherein the processor is configured to read the instructions from the memory and execute the instructions to:

display the target special effect image in real-time on the images of the captured video in a process of drawing the trajectory recording image.

13. The electronic device according to claim 12, wherein the processor is configured to read the instructions from the memory and execute the instructions to:

set transparency of other areas in the target special effect image except the plurality of display units to transparent in the process of drawing the trajectory recording image, to obtain a special effect image to be displayed; and superpose the special effect image to be displayed on the images of the captured video for display.

14. The electronic device according to claim 10, wherein the processor is configured to read the instructions from the memory and execute the instructions to:

create a canvas, and draw in the canvas circular areas at two positions corresponding to the recognition object based on the position information of the recognition object in first and second frame images of the captured video;

determine a target line connecting the two positions, and determine a trajectory area based on the target line, wherein a distance of each point in the trajectory area to the target line is less than or equal to a radius of the circular area; and set transparencies of the two circular areas and the trajectory area to transparent, to obtain the trajectory recording image.

15. The electronic device according to claim 14, wherein the processor is configured to read the instructions from the memory and execute the instructions to:

determine a target point between the two positions, filter out and draw the target point based on a distance of the target point to the target line, to obtain the trajectory area, wherein an angle between a first line corresponding to the target point and the target line and an angle between a second line corresponding to the target point and the target line are both acute angles, and the first line and the second line are lines respectively connecting the target point and the two positions.

16. The electronic device according to claim 10, wherein the transformation processing comprises a first transformation operation or a second transformation operation, wherein the first transformation operation comprises a replication operation and a mirroring operation, and the second transformation operation comprises a rotation operation and a moving operation.

17. The electronic device according to claim 16, wherein at least one of replication times corresponding to the replication operation, a rotation angle corresponding to the rotation operation, an image position, or an image size is adjustable.

18. A non-transitory computer readable storage medium, wherein the computer readable storage medium stores a computer program, and the computer program, when executed by a processor, causes the processor to:

obtain images of a captured video;

determine position information of a recognition object based on the images of the captured video, and draw a trajectory recording image based on the position information of the recognition object;

perform superposition processing on the trajectory recording image and a preset special effect material image to obtain a unit special effect image, wherein the unit special effect image comprises the trajectory recording image and the preset special effect material image used as a background of the trajectory recording image;

perform transformation operation to the unit special effect image to obtain at least one transformed unit special effect image; using the unit special effect image and the at least one transformed unit special effect image as a plurality of display units; combining the plurality of display units to generate a target special effect image; and add the target special effect image to the images of the captured video, to display the target special effect image in an animation mode, wherein the plurality of display units are displayed in different transparencies in a process of displaying the target special effect image, and the plurality of display units are displayed in a same transparency in response to the target special effect image being displayed fully.

* * * * *